Figure 1:
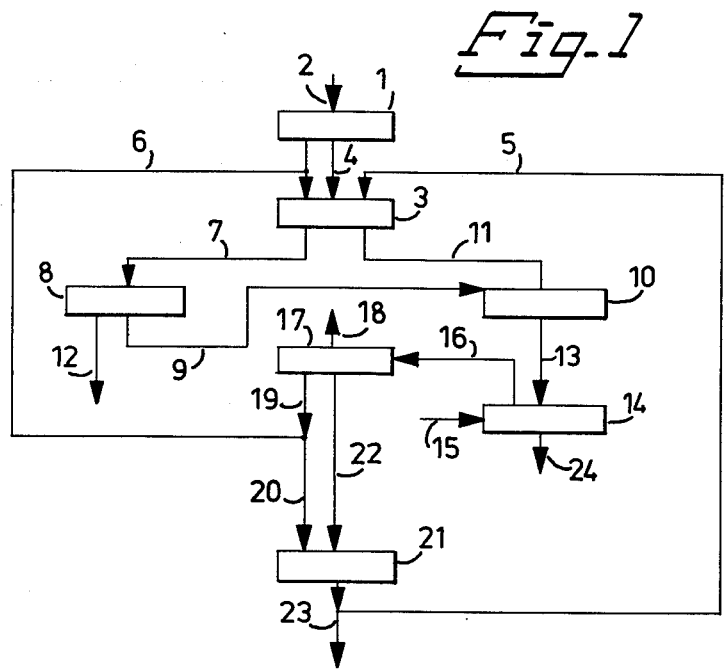

United States Patent [19]

Miöen

[11] 4,120,934

[45] Oct. 17, 1978

[54] METHOD FOR WORKING-UP SHALE

[75] Inventor: Thomas K. Miöen, Stockholm, Sweden

[73] Assignee: Boliden Aktiebolag, Stockholm, Sweden

[21] Appl. No.: 700,032

[22] Filed: Jun. 25, 1976

[30] Foreign Application Priority Data

Jul. 1, 1975 [SE] Sweden ............................ 7507509

[51] Int. Cl.² .............................................. B01D 11/00
[52] U.S. Cl. ..................................... 423/18; 423/20; 423/57; 423/67; 423/128; 423/132; 423/166; 423/304; 75/84.1 R
[58] Field of Search ............... 423/18, 20, 132, 530, 423/542, 57; 75/84.1 R

[56] References Cited

U.S. PATENT DOCUMENTS

| 2,954,218 | 9/1960 | Dew et al. ........................ 423/20 X |
| 2,979,378 | 4/1961 | Koble ................................. 423/17 |
| 3,183,058 | 5/1965 | Peter .................................. 423/3 |
| 3,273,972 | 9/1966 | Campbell et al. ................ 423/18 X |
| 3,843,524 | 10/1974 | Perricone et al. ................ 252/1 |
| 3,920,788 | 11/1975 | Mercier et al. .................... 423/18 |

Primary Examiner—Benjamin R. Padgett
Assistant Examiner—Josephine L. Barr
Attorney, Agent, or Firm—Stevens, Davis, Miller & Mosher

[57] ABSTRACT

The invention is a method for working-up shale while recovering metals therefrom and the sulphur content thereof. The method comprises crushing the shale and leaching and roasting the shale. The sulphur content is oxidized and converted into sulphuric acid, concentrated sulphur dioxide or sulphur. The leaching operation is effected with sulphuric acid. The leached metals are recovered in a manner known per se and the residual solution is passed to the roasting stage.

18 Claims, 2 Drawing Figures

METHOD FOR WORKING-UP SHALE

The present invention relates to a method for working-up shale whilst recovering the sulphur content thereof and metals therefrom, said method also enabling the calorific value of the shale to be utilized.

The most famous shale finds in Sweden are in Kvarntorp and Billingen. In addition to their valuable carbon content, these shales also contain recoverable metals, of which uranium is the best known. Examples of other recoverable metals in the shale include Mo, V, Al, Mg, K and Na. The shales also contain a relatively large quantity of sulphur, mainly in the form of pyrites, and valuable quantities of phosphorous in the form of phosphate. The calorific value of the shales lies between 6 and 10 MJ/kg.

In Kvarntorp, shale was broken for many years for the recovery of shale oil, while the whole of the metal content of the shale, including uranium, is left in the resulting shale ash.

Subsequent to a long development period, in 1965 a plant was set into operation to recover 120 tons of uranium each year from shale obtained from Billingen in Ranstad. Owing to the high cost of recovering the uranium and to the steady increase in the use of enriched uranium, the plant was soon used primarily for research work on a small scale.

One feature distinguishing those working-up methods used in Ranstad, which methods are suitable for shales of the type found in Billingen and the remainder of the Westgothic mountains, was the high priority given to the recovery of uranium. It is true that the chemical processes used can be effected in a manner such that molybdenum, vanadium and possibly other metals can be recovered, but in this case the carbon and sulphur content of the shale is lost in the process.

The working-up methods used in Ranstad required the shale to be crushed and then leached with an approximately 14% sulphuric acid, which was produced on the site by diluting concentrated sulphuric acid. Owing to the difficulties involved with the handling or dispensing of large quantities of aluminium sulphate, iron sulphate etc. formed during the process, a stronger acid is not used for the leaching process, even though, from the aspect of high uranium yields, a stronger acid would be more advantageous. With such methods all the carbon and sulphur contained in the shale remains in the leaching residue together with a large portion of the metal content of the shale, with the exception of uranium which is leached out to 65-75% and the leaching solution deposited or disposed of in this state. Uranium and, optionally leached molybdenum, is then extracted from the leaching solution. Subsequent to the uranium extraction step, the acid residual solution is neutralized with lime. In this way there is formed a sludge comprising mainly gypsum and metal hydroxides. The residual solution, together with its sludge content is also disposed of.

Processes of this type are encumbered with a number of disadvantages from the environmental and economic aspect, of which disadvantages can be mentioned:

(a) The calorific value of the shale is lost;

(b) The sulphur content of the shale is lost;

(c) The sulphuric acid requirement must be satisfied by purchasing sulphuric acid or raw material for the manufacture thereof;

(d) When the leaching residue is deposited, the sulphur remaining therein becomes an environmental hazard, owing to the fact that water-soluble sulphur compounds can be leached therefrom;

(e) The sludge obtained when neutralizing the residual solution is bulky, is difficult to handle and also constitutes an environmental hazard when deposited, owing to its content of heavy metals.

Processes in which the carbon and the hydrocarbon content of the shales can be utilized without rendering the recovery of uranium and other metals difficult or impossible have been proposed and discussed. In this respect it is important that the leachability of the shales is not lost and that the sulphur can be recovered or rendered innocuous by combustion or degasification. The requirements for the recovery of uranium are disclosed, for example, in "Sveriges Offentliga Utredningar" SOU 1974: 73, pages 22-23.

The sulphur content of shale or shale leaching residues is the main problem encountered when roasting or combusting the same. When roasting or combusting shale or shale leaching residues, the resulting gases contain $SO_2$, although their content in this respect is so low as to render it impossible to recover the sulphur dioxide by absorption processes in an economically acceptable manner, or to use the sulphur dioxide for the manufacture of sulphur acid or other sulphur products. On the other hand, the $SO_2$ content of such gases is too high for the gas to be released to atmosphere without cleaning the gas. Sulphur dioxide released to atmosphere causes environmental problems by acidifying the water and the ground on to which it falls.

The present invention enables shale to be worked-up in a surprising manner while recovering metals and sulphur therefrom by means of a method comprising crushing the shale; roasting the crushed shale and converting the sulphur dioxide in the roasting gases into sulphuric acid, concentrated sulphur dioxide or sulphur; said leaching operation being effected with a sulphuric acid solution; recovering leached metals, such as uranium, molybdenum, aluminum and vanadium together with phosphorus from the leaching solution in a known manner; and passing the residual leaching solution to the roasting stage.

The method according to the invention also enables the combustion heat of the shale to be recovered and also satisfactorily solves the environmental problems associated with the working-up of shale, since the residual products from the working-up process are either eliminated or are present in a form which is not harmful to the environment.

Owing to the fact that the residual leaching solution is passed to the roasting stage in which shale and/or shale leaching residues are roasted, subsequent to extracting metals from said solution and optionally subsequent to neutralizing said solution, several problems associated with the working-up of shale are resolved simultaneously. The residual solution is mainly a sulphate solution, and, if it is not neutralized, contains sulphuric acid. Water is evaporated from the solution by the heat developed by the combustion reactions in the roasting furnace, and the sulphates, including the sulphuric acid, are split-off and reduced under the influence of the carbon content of the furnace fuel, wherewith sulphur dioxide and water are formed. The sulphur dioxide split off from the sulphate, together with the sulphur dioxide formed by the sulphur content of the shale or the leaching residue during the combustion process, is able, subsequent to being dried, to impart to the gas a total sulphur dioxide content of at least 3.2% by volume. In this way, the sulphur content of the gas can be converted into sulphuric acid, concentrated sulphur dioxide or sulphur in a technical and economic manner.

In accordance with the method the shale can be leached in one or more stages, whereafter the leaching residue is roasted, although it is also possible to first roast the shale and then leach the roasted product in one or more stages. Alternatively the shale and leaching residue can be roasted simultaneously. The shale is conveniently roasted in a fluidized bed furnace, the roasting being effected in a plurality of stages or in a plurality of furnaces. Alternatively, multi-stage roasting of the shale can be effected in the same furnace. Oxygen gas or oxygen enriched air gas can be used during the roasting operation, thereby to further increase the sulphur dioxide content of the gas. The sulphur dioxide content can also be increased by introducing in addition to $SO_4^{2-}$ present in the leach solution, also sulphuric acid, which is split-off in the roasting furnace. Preferably, there is used in this case sulphuric acid which has been produced from the sulphur dioxide content of the roaster gases. Pyrite or some other sulphur containing material may also be charged to the roasting furnace and co-roasted with shale and/or leaching residue. In order to increase the yield of incoming metals still further, the roasted shale leaching residue may be further leached in at least one leaching stage.

When the roasting process is effected as a sulphatizing roasting process or is succeeded by a separate sulphatizing step, the metal contents remaining in the roasted product, such as U, Al, K, Mg, can readily be leached out with water or a weak acid solution.

Roasting may also be effected at temperatures of such magnitude that the roasted product is sintered, in which form it is easier to handle and, when deposited, is not readily decomposited or the contents thereof readily leached out.

The solution remaining after the leaching stage can be used to slurry the material to be roasted, the material in this case being charged to the roasting furnaces in the form of a suspension or a slurry. It is fully possible, however, to charge the residual solution as solid material separately to the roasting stage.

The heat developed by the combustion of the shale is used partly to evaporate and to split-off sulphate and partly to produce hot water, steam or electric energy. The combustion gases are suitably cooled in a waste-heat boiler so as to obtain steam. With the subsequent cooling in a cooling tower or some similar cooling apparatus, water is condensed from the combustion gases so as to provide hot water. Steam and hot water can also be produced in cooling tubes arranged in the bed of the roasting furnace. Alternatively steam and hot water can be produced by cooling the roasted products leaving the roasting furnace. The steam thus generated can be used to produce electrical energy in a known manner.

Because of its chemical composition and physical form, the roasted product obtains hydraulic properties and is able to solidify subsequent to being moistened, and hence the roasted product can be advantageously used for manufacturing building materials. These properties are also an advantage in respect of depositing said products, since they can be disposed of in a suitable aggregate form.

When the residual solution passed to the roasting stage is neutralized, which results in the formation of gypsum, the gypsum will be incorporated in the roasted product, which will additionally enhance the previously mentioned properties of the roasted product and increase its characteristics with respect, for example, to its mechanical strength and resistance to leaching. It is also possible, however, to separate the gypsum during the neutralization process and to unite it with the roasted product without roasting the gypsum. It is also possible to separate the gypsum and to use the same for manufacturing gypsum slabs for building purposes, or to utilize the gypsum in some other way.

Alkali metals and/or alkaline earth metals can be leached from the roasted product before it is used or deposited, with water or a weak acid solution.

Conveniently, the sulphur content of the combustion gases is utilized and eliminated by oxidizing the sulphur dioxide to sulphur trioxide, which is absorbed in the sulphuric acid in a known manner whilst supplying water to the process. It is also within the scope of the invention to produce liquid sulphur dioxide or elementary sulphur from the sulphur contained in the gases.

The proposed process enables the sulphur contained in the shale to be used to manufacture sulphur containing chemicals, such as aluminum sulphate and potassium sulphate. Aluminum sulphate is widely used as a water purification agent, but can also be converted to aluminum oxide, which may be used as a raw material for the manufacture of aluminum in metallic form.

The method according to the invention affords a number of positive advantages, of which the following are examples:

The residual solution and the sludge formed when neutralizing the solution are eliminated, such sludge being harmful to the environment. The calorific value of the shale can be utilized. The leaching residue is freed from sulphur, wherewith the residue is less harmful to the environment when deposited.

It is not necessary to purchase concentrated sulphuric acid or sulphur in order to effect leaching of the shale, but that the sulphur contained in the shale can be utilized instead. It has been officially announced that 6,000,000 tons of shale per year will be leached in a new Ranstad plant and that 300,000 tons of concentrated sulphuric acid will be used in the process.

The greater liberty obtained with the leaching process according to the invention which makes it possible to permit iron and other undesirable elements to be leached out without any problems, since these are returned to the roasting furnace and need not be precipitated out (neutralized) to produce precipitates which cannot safely be deposited.

This increased liberty with respect to the leaching process may also affect the choice and size of the leaching equipment and may provide an increased leaching yield with regard to uranium, aluminum and other valuable elements present in the starting material.

Large quantities of water are saved, since water from the leaching solution is recovered during the roasting process and is then re-used for preparing the leaching solution.

Figure 2:
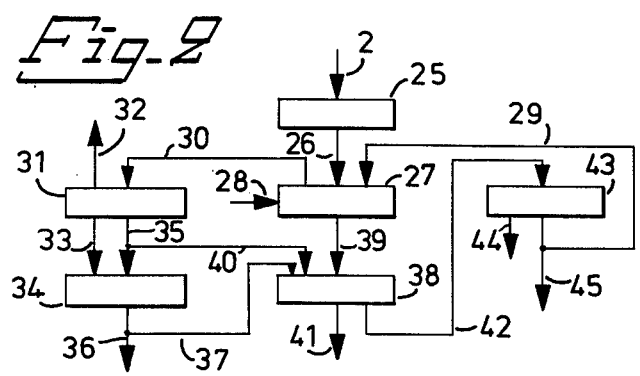

The invention will now be illustrated with reference to the accompanying drawing, in which FIG. 1 is a block diagram of a method according to the invention, in which crushed shale is first leached and the leaching residue roasted, and FIG. 2 illustrates a method for roasting crushed shale, followed by leaching the roasted product.

In FIG. 1 there is shown a crushing stage 1 to which shale is passed via a line 2. The crushed shale is passed to a leaching tank 3 via a line 4. Sulphuric acid is passed to the tank 3 via a line 5 and water is passed to the tank via a line 6.

The solution formed during the leaching operation is passed to an extraction stage 8 through a line 7, in which stage uranium, molybdenum and possibly other metals present, such as aluminum and vanadium together with phosphorus, are recovered in a manner known per se. The residual solution is passed through a line 9 to a slurrying stage 10 and is there used to slurry leaching residue from the leaching tank 3, this leaching residue being passed to the slurrying stage 10 through a line 11. The arrow 12 indicates the removal of valuable elements separated in the extraction stage. The slurry is passed from the slurrying stage 10 to a roasting furnace 14 through a line 13. Conveniently, the roasting furnace 14 is in the form of a fluidized bed furnace to which oxygen and a fluidizing gas are charged separately or in mixture through a line 15. Roaster gases are removed from the roasting furnace 14 and are passed through a line 16 to a waste heat boiler 17, where steam is generated and thus energy is taken out through a line 18. Condensed water is removed through a line 19 and is passed to the leaching stage 3 through a line 6 and to a sulphuric acid plant 21 through a line 20. Roaster gases containing sulphur dioxide are also passed to the sulphuric acid plant, said gases optionally being passed to cleaning apparatus for the removal of dust, arsenic, mercury and like harmful substances through a line 22. Sulphuric acid is then passed from the plant 21 for external use through a line 23 and back to the leaching tank 3 through the line 5 for use in subsequent leaching operations. The roasted product is removed from the roasting furnace 14 through a line 24 and may then be subjected to further leaching operations for the removal of, for example, K, Na or Mg, whereafter said product is either deposited or further worked-up.

In the embodiment shown in FIG. 2, shale is charged to a crushing stage 25 through a line 26. The crushed shale is passed from the crushing stage 25 through a line 26 to a roasting furnace 27, which may conveniently be a fluidized bed furnace, to which furnace fluidizing gas and oxygen are supplied either separately or in mixture, through a line 28. A purified leaching liquid is also passed to the roasting furnace, through a line 29. Roaster gases obtained in the furnace 27 are removed therefrom through a line 30 and passed to a waste heat boiler 31, from which energy is taken out through a line 32. Subsequent to passing through known gas-cleaning apparatus, the roaster gas is fed to a sulphuric acid plant 34 through a line 33, to which plant condensed water is also supplied through a line 35. Sulphuric acid is removed from the sulphuric acid plant 34 for external use through a line 36 and for use in a leaching tank 38 through a line 37. Roasted products obtained in the furnace 27 are passed to the leaching tank 38 through a line 39, to which tank water is passed through a line 40. The leaching residue obtained in the tank 38 is passed therefrom through a line 41. Leaching solution is passed from the tank 38 to an extraction stage 43 through a line 42. Valuable elements such as uranium, molybdenum, aluminum, vanadium and phosphorus are removed from the extraction stage 43 as indicated by the arrow 44, whilst leaching solution is returned to the roasting furnace 27 through the line 29 or through a line 45 for further purification.

EXAMPLE 1

In a plant according to FIG. 1 7500 tons of shale were treated each day. The shale was of the Billingen type and contained, inter alia, 16% by weight C and 6.4% by weight S and was leached whilst adding approximately 450 tons of 97% by weight sulphuric acid and approximately 2800 tons of water per day. The temperature of the water was approximately 90° C. and the water was recovered from the gases obtained in the subsequent roasting stage, subsequent to the gases being cooled in the waste-heat boiler and their water content being condensed out in a cooling tower.

2750 tons of leaching solution were used each day, from which solution uranium and molybdenum were recovered. The residual leaching solution was then passed to the roasting stage and used for slurrying 3200 tons per day of moist leaching residue from the shale leaching stage. The resulting slurry was charged to a roasting furnace as were also a further 4800 tons per day of leaching residue, this latter residue being charged to the furnace without previously being slurried.

Roasting was effected at a temperature of approximately 800° C. whilst supplying air to the furnace in a manner such as to obtain complete combustion of the carbon content of the material.

The gases obtained during the roasting operation contained approximately 45% by volume steam, of which approximately 5% originated from the combustion of shale and the remainder from the combustion of the leaching solution slurry charged to the furnace. Subsequent to cooling the gases in a waste-heat boiler, the gases were passed to a cooling tower in which approximately 3000 tons of water were obtained each day in the form of a condensate. Of this condensate approximately 2800 tons were passed each day to the leaching stage and the remainder was passed to a plant for the manufacture of sulphuric acid in accordance with the contact method, and was also said gas which was substantially free of water, said gas containing approximately 3.2% by volume $SO_2$.

Approximately 870 tons of 97% by weight sulphuric acid were produced from this gas each day, of which quantity approximately 450 tons were returned each day to the leaching stage.

A roasted product having a residual content of approximately 0.4% by weight S and less than 0.5% by weight C was also discharged from the roasting furnace, said product being deposited. Approximately 3000 tons of steam were obtained each day from a steam plant connected to the roasting stage, said steam having a pressure of 4 MPa and a temperature of approximately 400° C. This steam was passed to a steam-turbine driven electric generator, wherewith electrical energy reaching to approximately 13850 GJ at a power of approximately 160 MW was obtained each day. Of the total energy content of the shale, approximately 53,000 GJ, approximately 26% was recovered in the form of electric energy.

The following sulphur balance was true for the roasting stage:

| Input quantities | tons S/day |
|---|---|
| Leached shale | 450 |
| Leaching solution (returned) | 100 |

-continued

| Output quantities | | Total | 550 |
|---|---|---|---|
| | Roaster gas containing 3.2% by volume SO$_2$ | | 525 |
| | Roasted products containing 0.4 % by weight S | | 25 |
| | | Total | 550 |

| Energy balance for the roasting stage | | |
|---|---|---|
| Input | GJ/h | % |
| Shale 312t/h at 7.13 GJ/t | 2225 | 100 |
| Output | | |
| Steam from waste-heat boiler | 612 | 27.5 |
| Steam from fluidized bed cooling | 734 | 33.0 |
| From the cooling tower | | |
| Condensate | 293 | 13.2 |
| Cooling water | 105 | 4.7 |
| Gases to H$_2$SO$_4$-plant | 314 | 14.1 |
| Roasted products (300° C) | 62 | 2.8 |
| Losses | 105 | 4.7 |
| | 2225 | 100 |

EXAMPLE 2

The method described in Example 1 was supplemented with a step in which residual leaching solution, obtained after extracting uranium and molybdenum from the leaching solution, was neutralized. The residual solution was neutralized with lime, whereupon precipitates containing, inter alia, Al, V and P were formed. The neutralized leaching solution has a pH of 4.1 and was passed to the roasting stage, as with the method described in Example 1. In this way the sulphur dioxide content of the roaster gases was lowered to 2.3% by volume owing to the fact that sulphates were precipitated out during the neutralizing operation.

EXAMPLE 3

The method described in Example 2 was repeated, but with the exception that air enriched with oxygen gas with 28.5% by volume oxygen was supplied to the roasting stage. In this way the roaster gases obtained an SO$_2$ content of 3.2% by volume, similar to that in Example 1, without neutralizing the residual leaching solution.

EXAMPLE 4

The method disclosed in Example 2 was repeated, but with the exception that approximately 300 tons of 97% by weight H$_2$SO$_4$ obtained from the sulphuric acid plant were returned each day to the roasting stage. The roaster gases obtained an SO$_2$ content of 3.2% by volume.

I claim:

1. A method for working-up shale while recovering metals therefrom and the sulfur content thereof, comprising crushing the shale; roasting the crushed shale in a roasting furnace, whereby a sulfur dioxide containing gas is obtained; removing the gas from the furnace and passing it to a stage in which sulfur is recovered as sulfuric acid, elementary sulfur or liquid sulfur dioxide; leaching the roasted shale with a aqueous sulfuric acid solution so as to dissolve recoverable metals present in the shale, said recoverable metals comprising one or more of the metals uranium, molybdenum, vanadium, aluminum, magnesium, potassium and sodium and also any phosphorus in the form of phosphate; recovering valuable constituents of the leaching soution by means of extraction and precipitation; passing the residual leaching solution to the roasting furnace and converting in said roasting furnace the sulfur content of the residual leaching solution to sulfur dioxide during simultaneous roasting and combustion of the shale therein.

2. A method for working-up shale while recovering metals therefrom and the sulfur content thereof, comprising crushing the shale; leaching the crushed shale by supplying an aqueous sulfuric acid solution so as to dissolve recoverable metals present in the shale, said recoverable metals comprising one or more of the metals uranium, molybdenum, vanadium, aluminum, magnesium, potassium and sodium and also any phosphorus in the form of phosphate; recovering valuable constituents of the leaching solution by means of extraction and precipitation; passing the residual leaching solution and leached crushed shale to a roasting furnace for roasting treatment whereby the sulfur supplied to the roasting furnace included in the leaching solution and the leached shale is converted to sulfur dioxide and removing the sulfur dioxide included in a roaster gas to a stage in which sulfur is recovered as sulfuric acid, elementary sulfur or a liquid sulfur dioxide.

3. A method according to claim 1, wherein the shale is roasted in at least one stage in a fluidized bed furnace.

4. A method according to claim 1, wherein said roasting is effected with oxygen gas or oxygen enriched air.

5. A method according to claim 1, wherein in addition to leaching solution, sulphuric acid is charged to the roasting furnace.

6. A method according to claim 1, wherein elementary sulphur or sulphides are charged to the roasting furnace.

7. A method according to claim 1, wherein a sulphatizing reactor is arranged downstream of the roasting furnace prior to the leaching stage.

8. A method according to claim 2, wherein said roasting is effected at a temperature of such magnitude that the roasted product sinters.

9. A method according to claim 2, wherein the roasted product is subjected to at least one further leaching stage.

10. A method according to claim 7, wherein said leaching is effected with a neutral or weak acid solution.

11. A method according to claim 1, wherein materials are charged to the roasting furnace slurried with residual leaching solution.

12. A method according to claim 1, wherein the calorific value of the shale is utilized to produce steam, hot water or electrical energy.

13. A method according to claim 2, wherein the shale is roasted in at least one stage in a fluidized bed furnace.

14. A method according to claim 2, wherein said roasting is effected with oxygen gas or oxygen enriched air.

15. A method according to claim 2, wherein in addition to leaching solution sulfuric acid is charged to the roasting furnace.

16. A method according to claim 2, wherein elementary sulfur or sulfides are charged to the roasting furnace.

17. A method according to claim 2, wherein materials are charged to the roasting furnace slurried with residual leaching solution.

18. A method according to claim 2, wherein the calorific value of the shale is utilized to produce steam, hot water or electrical energy.

* * * * *